(12) United States Patent
Hyde et al.

(10) Patent No.: US 9,722,468 B2
(45) Date of Patent: Aug. 1, 2017

(54) MOTOR WITH ROTOR-MOUNTED CONTROL CIRCUITRY

(71) Applicant: DEEP SCIENCE LLC, Bellevue, WA (US)

(72) Inventors: Roderick A. Hyde, Redmond, WA (US); Jordin T. Kare, San Jose, CA (US); Lowell L. Wood, Jr., Bellevue, WA (US)

(73) Assignee: Deep Science LLC

( * ) Notice: Subject to any disclaimer, the term of this patent is extended or adjusted under 35 U.S.C. 154(b) by 0 days.

(21) Appl. No.: 15/188,526

(22) Filed: Jun. 21, 2016

(65) Prior Publication Data

US 2016/0301273 A1    Oct. 13, 2016

Related U.S. Application Data

(63) Continuation of application No. 14/337,385, filed on Jul. 22, 2014, now Pat. No. 9,397,591, which is a (Continued)

(51) Int. Cl.
| | |
|---|---|
| H02K 29/08 | (2006.01) |
| H02K 3/28 | (2006.01) |
| H02K 17/16 | (2006.01) |
| H02K 11/20 | (2016.01) |
| H02K 11/30 | (2016.01) |

(Continued)

(52) U.S. Cl.
CPC ............... H02K 3/28 (2013.01); H02K 1/22 (2013.01); H02K 11/20 (2016.01); H02K 11/30 (2016.01); H02K 11/33 (2016.01); *H02K 15/02* (2013.01); *H02K 17/165* (2013.01); *H02P 6/28* (2016.02); *H02K 2213/09* (2013.01)

(58) Field of Classification Search
CPC .. H02K 28/08; H02K 1/18; H02P 6/08; H02P 5/28
USPC .... 318/400.01, 400.02, 400.14, 400.15, 700, 318/701, 721, 799, 800, 801, 400.37, 318/400.38, 400.39, 400.4, 430, 437, 661; 388/800, 811, 819
See application file for complete search history.

(56) References Cited

U.S. PATENT DOCUMENTS

| | | |
|---|---|---|
| 3,439,203 A | 4/1969 | Koizumi |
| 3,964,296 A | 6/1976 | Matzuk |

(Continued)

FOREIGN PATENT DOCUMENTS

| | | |
|---|---|---|
| JP | 01-231637 | 9/1989 |
| JP | 04-340350 | 11/1992 |

(Continued)

OTHER PUBLICATIONS

PCT International Search Report; International App. No. PCT/US 11/00901; Nov. 2, 2011; pp. 1-2.

(Continued)

*Primary Examiner* — Antony M Paul

(57) ABSTRACT

A rotating electromechanical machine has a rotor having at least one current-carrying winding and at least one rotor-mounted sensor configured to sense a machine property or parameter during machine operation. Rotor-mounted circuitry dynamically modifies at least one property of the current-carrying winding during machine operation in response to the sensed machine property or parameter.

40 Claims, 7 Drawing Sheets

Related U.S. Application Data continuation of application No. 13/967,834, filed on Aug. 15, 2013, now Pat. No. 8,816,624, which is a continuation of application No. 12/800,717, filed on May 19, 2010, now Pat. No. 8,536,813.

(51) Int. Cl.
  *H02K 11/33* (2016.01)
  *H02P 6/28* (2016.01)
  *H02K 1/22* (2006.01)
  *H02K 15/02* (2006.01)

(56) References Cited

U.S. PATENT DOCUMENTS

| | | | |
|---|---|---|---|
| 4,101,793 | A | 7/1978 | Berthet et al. |
| 4,169,990 | A | 10/1979 | Lerdman |
| 4,177,395 | A | 12/1979 | Hore |
| 4,393,344 | A | 7/1983 | Whellams |
| 4,704,906 | A | 11/1987 | Churchill et al. |
| 4,785,213 | A | 11/1988 | Satake |
| 5,217,085 | A | 6/1993 | Barrie et al. |
| 5,424,625 | A | 6/1995 | Haner |
| 5,473,906 | A | 12/1995 | Hara et al. |
| 5,936,374 | A | 8/1999 | Haner |
| 6,046,560 | A | 4/2000 | Lu et al. |
| 6,222,289 | B1 | 4/2001 | Adames |
| 6,226,073 | B1 | 5/2001 | Emoto |
| 6,321,032 | B1 | 11/2001 | Jones et al. |
| 6,437,770 | B1 | 8/2002 | Venema et al. |
| 6,504,275 | B2 | 1/2003 | Nondahl et al. |
| 6,755,554 | B2 | 6/2004 | Ohmae et al. |
| 6,774,599 | B2 | 8/2004 | Ishii |
| 6,935,119 | B2 | 8/2005 | Placko et al. |
| 7,053,586 | B2 | 5/2006 | Jones |
| 7,166,984 | B1 * | 1/2007 | Jones .............. H02K 17/12 310/254.1 |
| 7,199,542 | B1 | 4/2007 | Chen |
| 7,375,488 | B2 | 5/2008 | Jones |
| 2001/0008352 | A1 | 7/2001 | Nondahl et al. |
| 2001/0028200 | A1 | 10/2001 | Hwang et al. |
| 2006/0113851 | A1 | 6/2006 | Ishihara et al. |
| 2007/0095075 | A1 | 5/2007 | Frank |
| 2007/0223891 | A1 | 9/2007 | Horng et al. |
| 2008/0001486 | A1 | 1/2008 | Smith |
| 2008/0238223 | A1 | 10/2008 | Tilton et al. |
| 2008/0252155 | A1 | 10/2008 | Waddell et al. |
| 2009/0195091 | A1 | 8/2009 | Nakahara et al. |
| 2010/0006439 | A1 | 1/2010 | Ham et al. |
| 2010/0134058 | A1 | 6/2010 | Nagashima et al. |

FOREIGN PATENT DOCUMENTS

| | | |
|---|---|---|
| JP | 07-222358 | 8/1995 |
| JP | 2004-032945 | 1/2004 |
| JP | 2005-245085 A | 9/2005 |
| JP | 2006-158105 A | 6/2006 |
| JP | 2006-345585 | 12/2006 |
| JP | 2008-115731 | 5/2008 |
| JP | 2008-256313 | 10/2008 |
| JP | 2008-263753 | 10/2008 |
| JP | 2009-510995 A | 3/2009 |
| JP | 2009-118693 | 5/2009 |
| JP | 2010-051130 A | 3/2010 |
| JP | 2010-057243 | 3/2010 |
| KE | 04-308442 | 10/1992 |

OTHER PUBLICATIONS

PCT International Search Report; International App. No. PCT/US2011/000902; Sep. 20, 2013; pp. 1-2.

\* cited by examiner

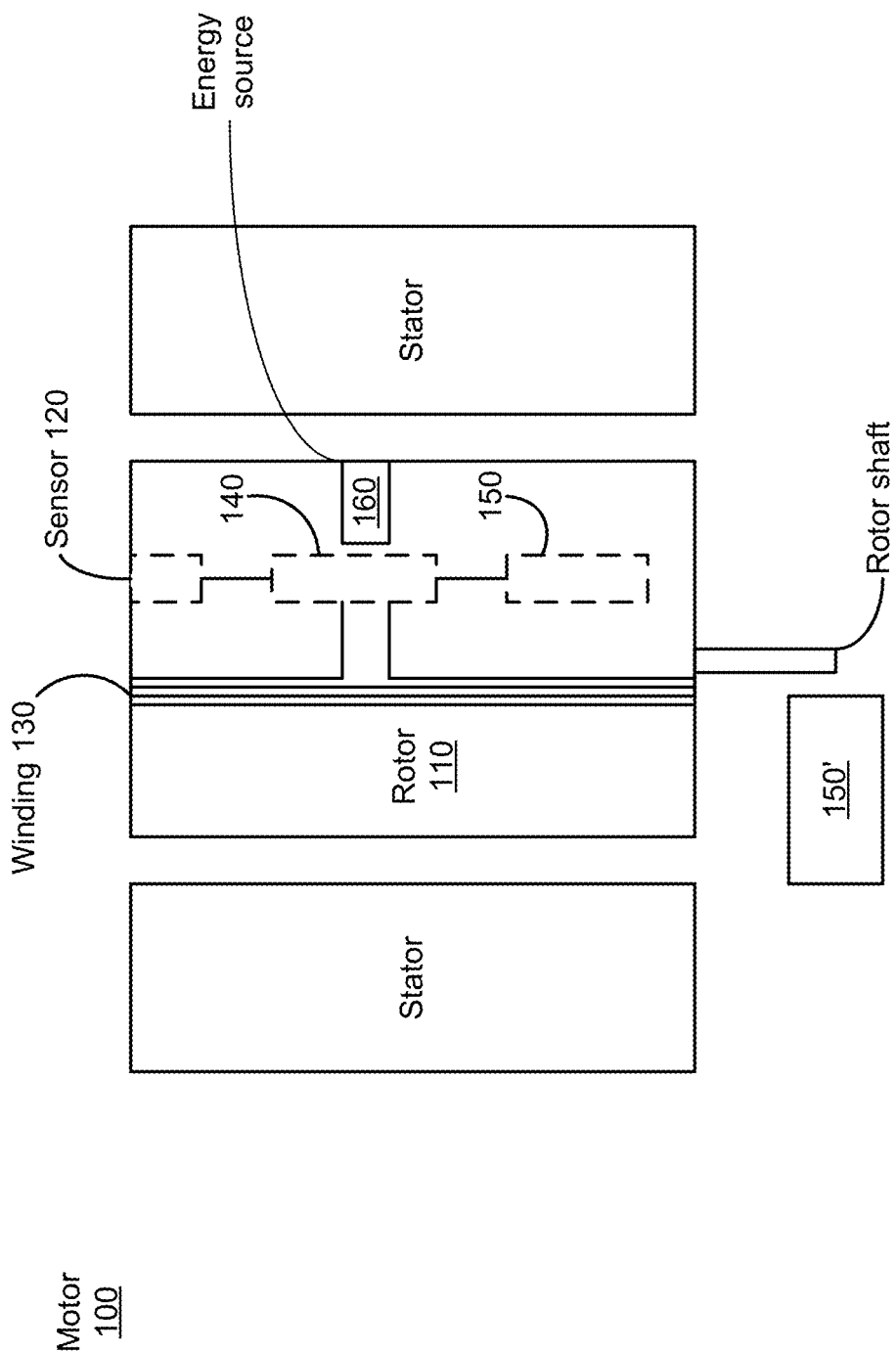

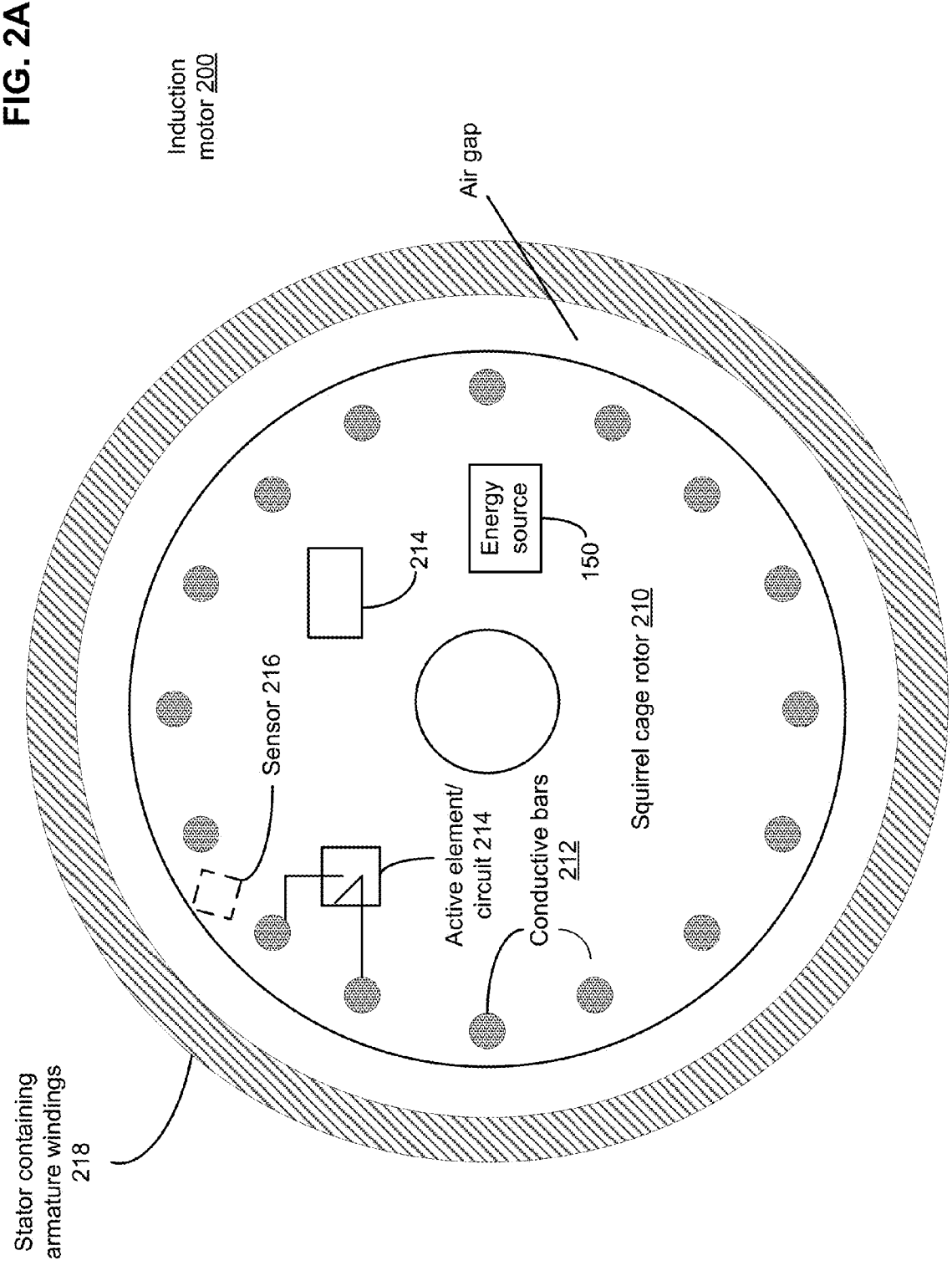

FIG. 4

Method 400

410
During operation of an electrical motor having a rotor with at least one current-carrying winding, sense a motor property using at least one rotor-mounted sensor

420
Dynamically modify a property of the current-carrying winding during motor operation in response to the sensed motor property

In an induction motor having a squirrel cage rotor with longitudinal conductive bars, sense a motor characteristic during motor operation

520

Switch individual longitudinal conductive bars in the rotor during motor operation to control or regulate an operational motor parameter Method 500

FIG. 6

610
Provide a rotor assembly for a motor, the rotor-assembly having an on-rotor sensor with a sensing portion coupled to an optical readout portion arranged to be optically read by an external reading device

620
Sense a motor parameter during motor operation with the on-rotor sensor

630
Display the sensed motor parameter values on the optical readout portion Method 600

MOTOR WITH ROTOR-MOUNTED CONTROL CIRCUITRY

PRIORITY APPLICATIONS

The present application constitutes a continuation of U.S. patent application Ser. No. 14/337,385, entitled MOTOR WITH ROTOR-MOUNTED CONTROL CIRCUITRY, naming RODERICK A. HYDE, JORDIN T. KARE and LOWELL L. WOOD, JR. as inventors, filed 22, Jul., 2014, which is currently co-pending or is an application of which a currently co-pending application is entitled to the benefit of the filing date, and which is a continuation of U.S. patent application Ser. No. 13/967,834, entitled MOTOR WITH ROTOR-MOUNTED CONTROL CIRCUITRY, naming RODERICK A. HYDE, JORDIN T. KARE and LOWELL L. WOOD, JR. as inventors, filed 15, Aug., 2013which is currently co-pending or is an application of which a currently co-pending application is entitled to the benefit of the filing date, and which is a continuation of U.S. patent application Ser. No. 12/800,717, entitled MOTOR WITH ROTOR-MOUNTED CONTROL CIRCUITRY, naming RODERICK A. HYDE, JORDIN T. KARE and LOWELL L. WOOD, JR. as inventors, filed 19, May, 2010.

BACKGROUND

This disclosure relates to electromechanical machines (e.g., electrical motors and/or electrical generators or alternators). The electromechanical machines include a stationary component (e.g., a stator assembly) and a non-stationary component (e.g., a rotor assembly), which moves relative to the stationary component. In rotating electromechanical machines, the rotor assembly is usually mounted on a rotor shaft and arranged to rotate with a predetermined air gap relative to the stator assembly. The stator assembly and rotor assembly may include permanent magnetic and/or electromagnetic elements or circuits (e.g., induction loops, wire windings, etc.), which create and/or interact with magnetic fields in the operation of the electromechanical machines.

Consideration is now being given to improving the performance characteristics of electromechanical machines.

SUMMARY

Approaches to improving the performance characteristics of electromechanical machines including motors and generators are provided.

In an exemplary approach, a rotating electrical machine has a "smart" rotor, containing "active" electronic control or regulatory elements. The active electronic elements (e.g., transistors) may be distinguished from passive electronic elements (e.g., resistors, capacitors, and inductors). In contrast to passive electronic elements, some of the active electronic elements may amplify the power of a signal under suitable conditions.

The active electronic elements may be mounted on or included within the rotor assembly. The smart rotor may not have any external wired connections (e.g., via slip rings) to the active electronic elements. The rotor-mounted active electronic elements may, for example, include one or more of switchgear, sensors, control circuitry and memory, telemetry devices, reactive elements, and/or energy-storage devices. The smart rotors may store or draw energy in other than electrical/magnetic or kinetic forms (e.g., in electrochemical form) from the internal energy-storage devices.

The rotor-mounted active electronic elements may act during machine operation to, for example, modify rotor-stator interactions. The rotor-mounted active electronic elements may be switchably coupled to at least one motor winding or circuit to controllably increase or decrease the rotor's angular rate or alter its position or orientation, for example, by increasing or reducing current flow through a rotor winding. The use of these rotor-mounted active electronic elements in a smart rotor may improve transient performance capabilities (e.g., enable mechanical surges without power-line surges, and controlled mechanical power-up or power-down capabilities in event of abrupt power-line voltage changes).

The rotor-mounted active electronic elements may enable attainment and maintenance of fractional rotational speed without significant loss-of-rated-torque, including cooperating with a stator each of whose windings are excited (e.g., with use of solid-state devices such as diodes and SCRs) with multiple half-waves of utility-derived current of the same polarity before switching to similar excitation of the opposite polarity. The rotor-mounted active electronic elements may further enable suppression of back EMF surges and voltage spikes in stator windings (and thus utility lines) via real-time measurement and active management of current flows in rotor windings or current loops.

BRIEF DESCRIPTION OF THE FIGURES

In the accompanying drawings:

FIG. 1 is a schematic diagram illustrating features of an exemplary motor having a smart rotor containing rotor-mounted active electronic elements, in accordance with the principles of the solutions described herein;

FIGS. 2A and 2B are schematic diagrams illustrating components of an exemplary induction motor having a smart squirrel cage rotor, in accordance with the principles of the solutions described herein;

Throughout the figures, unless otherwise stated, the same reference numerals and characters are used to denote like features, elements, components, or portions of the illustrated embodiments.

DESCRIPTION

Figure 2B:
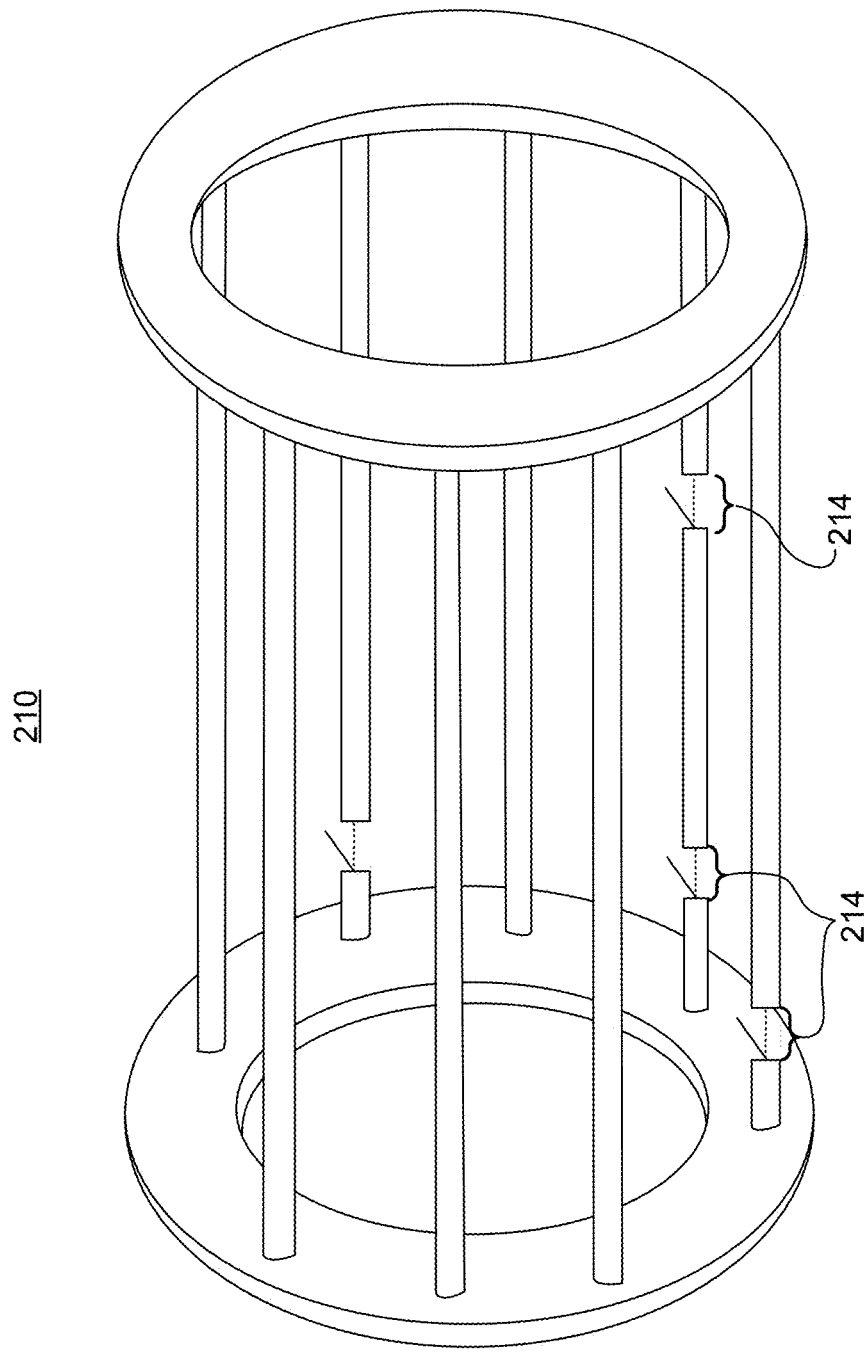

In the following description of exemplary embodiments, reference is made to the accompanying drawings, which form a part hereof. It will be understood that embodiments described herein are exemplary, but are not meant to be limiting. Further, it will be appreciated that the solutions described herein can be practiced or implemented by other than the described embodiments. Modified embodiments or alternate embodiments may be utilized, in the spirit and scope of the solutions described herein.

In one approach, a mechanically or electrically-rotating machine (e.g., a motor, a generator, an alternator, a synchronous condenser) includes one or more "active" elements in a rotating element (e.g., a rotor) that can modify the electromagnetic and/or mechanical characteristics of the rotor and thereby the operational behavior of the machine. The rotor may have no wired-or-electrically-conducting connection to other parts of the motor. The active element may, for example, include a nonlinear power device. The active element may behave other than a distributed inductor, a distributed capacitor, a distributed resistor, or a distributed inertial element. The active element may behave, for example, as a source of EMF, as a non-linear reactive or resistive element, as an energy-storage or energy-release element, a magnetic reluctance-varying element, or as a control of any such element or set of them. An active inertial element may include a mechanically movable rotor element (e.g., a sliding shaft-mounted element), an inertial moment changer, etc. A controller may be configured to provide feedback between rotor and stator windings.

The terms "rotor circuitry" or "rotor-mounted circuitry" may be used herein interchangeably with terms such as rotor windings, and/or current-carrying windings or circuits. In general, the terms rotor or rotor-mounted "circuitry" will be understood to refer to one or more of the active elements (e.g., a nonlinear power device, a source of EMF, a non-linear reactive or resistive element, an energy-storage or energy-release element, a magnetic reluctance-varying element, etc.), conductors (e.g., windings, conducting loops, wires or segments), and/or any combination thereof.

FIG. 1 shows an exemplary electrical machine (e.g., motor 100) having a smart rotor 110 containing rotor-mounted or -embedded active elements. Exemplary electrical motor 100 includes a rotor 110 having at least one current-carrying winding 130, rotor-mounted circuitry 140 responsive to at least one rotor-mounted [or rotor-embedded] sensor 120, and an optional controller 150/150'.

Rotor-mounted sensor 120 may be configured to sense a motor property (e.g., a voltage, current, temperature, rotational speed/acceleration, and or/magnetic field, etc.) during motor operation. The rotor-mounted sensor may, for example, be configured to sense at least one of a winding current, voltage, resistance, capacitance, inductance, magnetic field and/or direction, temperature, speed, rotation rate, rotation angle and/or angular acceleration.

Rotor-mounted sensor 120 may be a sensor of the type described, for example, in U.S. Pat. Nos. 4,704,906 or 6,504,275. The first cited patent describes a rotor-mounted sensor for measuring a stator-rotor air gap. The second cited patent describes rotor-mounted sensors for sensing current, torque, velocity, temperature, and/or air gap in a motor.

The rotor-mounted circuitry may include one or more active or passive electronic devices (e.g. resistance, inductance, capacitance, voltage source, current source, etc.) placed in series or parallel with the current-carrying winding. The rotor-mounted circuitry may, for example, include one or more one or more electronic switching devices (e.g., a triac, a silicon-controlled rectifier, solid state relay, switching transistors and/or a thyristor). Alternatively or additionally, the rotor-mounted circuitry may include linear electronic devices (e.g., a MOSFET, IGBT, bipolar transistor) and/or circuits (including circuits having non-linear devices that are set to operate in a linear regime).

The rotor-mounted circuitry may be configured to modify rotor conductor properties (e.g., real and/or imaginary components of impedance) of the rotor windings so as to control or regulate starting or running torque, to control or regulate starting or running current drawn from the utility mains, and/or to control or regulate peak electromechanical stresses on some motor component. Alternatively or additionally, the rotor-mounted circuitry may be configured to modify magnetic properties (e.g., magnetic reluctance) and/or mechanical properties (e.g., mechanical moments).

The rotor-mounted circuitry may be configured to dynamically modify a property of a current-carrying winding during motor operation in response to the sensed motor property, or a history or physical model of sensed motor properties, or an external command. For example, the rotor-mounted circuitry may be configured to modify a current and/or an impedance of the current-carrying winding. Further, the rotor-mounted circuitry may be configured to vary the property of the current-carrying winding as function of a rotor angle or position, angular rate and/or angular acceleration. The rotor-mounted circuitry may be configured to vary the property of the current-carrying winding as a continuous function. The rotor-mounted circuitry may be configured to vary the property of the current-carrying winding between a set of discrete property values.

Exemplary rotor-mounted circuitry for varying the property of the current-carrying winding may include a switch-mode regulator. The switch-mode regulator may be configured to switch the property of the current-carrying winding at a rate higher than a characteristic or nominal frequency (e.g., rotor's angular frequency, pole frequency, etc.). Thus, the property of the current-carrying winding may be varied as a function of a rotor angle or position in the course of machine operation. An effective value of the property of the current-carrying winding may be determined by a switching pulse rate and/or pulse width or amplitude of a switched variable. The nominal frequency may be any suitable frequency in consideration of machine characteristics and/or a degree of control desired. The nominal frequency may, for example, be about 10 KHz, 100 KHz, or 1 MHz.

The exemplary electrical motor may include a controller configured to supervise operation of the at least one rotor-mounted sensor and the rotor-mounted circuitry. The controller may include any suitable software, routines and/or algorithms for supervising the operation of the at least one rotor-mounted sensor and the rotor-mounted circuitry. An exemplary controller may be configured to regulate a motor operating parameter (e.g., starting current, running current, rotor temperature, power consumption, and/or torque).

An exemplary controller may include one or more rotor-mounted controller components and/or off-rotor controller components. The off-rotor components may be configured to communicate with the rotor-mounted circuitry, the at least one rotor-mounted sensor and/or the one or more rotor-mounted controller components via optical, RF, acoustic, ultrasound, induction, and/or conducting (e.g., slip ring or brush) means. The controller may be further configured to receive data inputs and commands from off-rotor sensors and/or external sources. The controller may, for example, include a signaling device which is capable of receiving or transmitting data (e.g., data pertinent to the rotor's state-or-condition or a control-setting).

Smart rotor 110 may have no wired-or-electrically-conducting connection to other parts of the motor. Smart rotor 110 may include rotor-mounted or embedded energy sources 150 (e.g., batteries, electrochemical cells, EMF power scavengers, etc.) to power operation of rotor mounted components or devices (e.g., sensors, circuitry, controllers, actuators, etc.). Alternatively or additionally, the rotor mounted components or devices may be powered by off-rotor power sources via wireless couplings (e.g., inductively and/or optically). Rotor 110 may, for example, include an inductively-coupled device (e.g., a transformer element) for this purpose. The rotor-mounted circuitry may operate without the complication of brushes or slip-rings to transfer power and/or data signals to or from external locations.

The controller may be configured to provide energy to individual rotor elements from the rotor-mounted or embedded energy sources 150 to flow currents in the rotor prior to or at motor start up (e.g., to control or regulate motor back-electromotive forces). Alternatively or additionally, the controller may be configured so that energy sources 150 receive energy from an off-rotor supply and store the same prior to or at motor start up. The controller may be configured or programmed so that energy is provided individual rotor elements from energy sources 150 according to a torque-to-load program or schedule FIGS. 2A and 2B show an exemplary induction motor 200 having a smart rotor configured, for example, as a squirrel cage rotor 210, which is disposed in a stator (e.g., stator 218 containing armature windings). An exemplary squirrel cage rotor 210 includes one or more switchable conductive bars (e.g., longitudinal bars 212) and active electrical elements to control or regulate motor operation. Induction motor 200 may include on-rotor and/or off rotor sensors (e.g. sensor 216) to sense or monitor motor parameters or conditions. The active electrical elements may, for example, include rotor-mounted circuitry 214 that is configured to switch individual bars 212 during motor operation in response to sensed motor parameters or conditions, and/or control program commands.

Rotor-mounted circuitry 214 may, for example, include transistors, circuits and switches. Rotor-mounted circuitry 214 may be configured to switch individual bars 212 to control or regulate an operational motor parameter (e.g., startup current, running current, rotor speed and/or torque). Rotor-mounted circuitry 214 may be configured to switch individual bars to control or regulate an operational motor parameter, for example, as function of one or more of a shaft angle, a magnetic field angle or phase, a motor current demand, and/or temperature. For this purpose, rotor-mounted circuitry 214 may be configured to open or close individual bars 212 during motor operation. Further, rotor-mounted circuitry 214 may be configured to connect individual bars to rotor-mounted energy sources 150 to modify or regulate motor operation (e.g., to modify a torque acting on the rotor). The rotor-mounted energy sources 150 may include one or more of inductors, capacitors, primary and/or secondary batteries, and/or other electrochemical elements on or within rotor 210.

Rotor-mounted circuitry 214 may be configured to modify rotor conductors and thus the mains-presented impedance of an induction motor. Rotor-mounted circuitry 214 may for example, include MOSFET or IGBT switches to switch rotor conductors into or out of a circuit. The rotor conductors may be switched one-or-more times during motor start-up to limit or regulate, for example, starting torque, starting-current drawn from the utility mains, and/or peak electromechanical stresses on some motor component.

Figure 3:
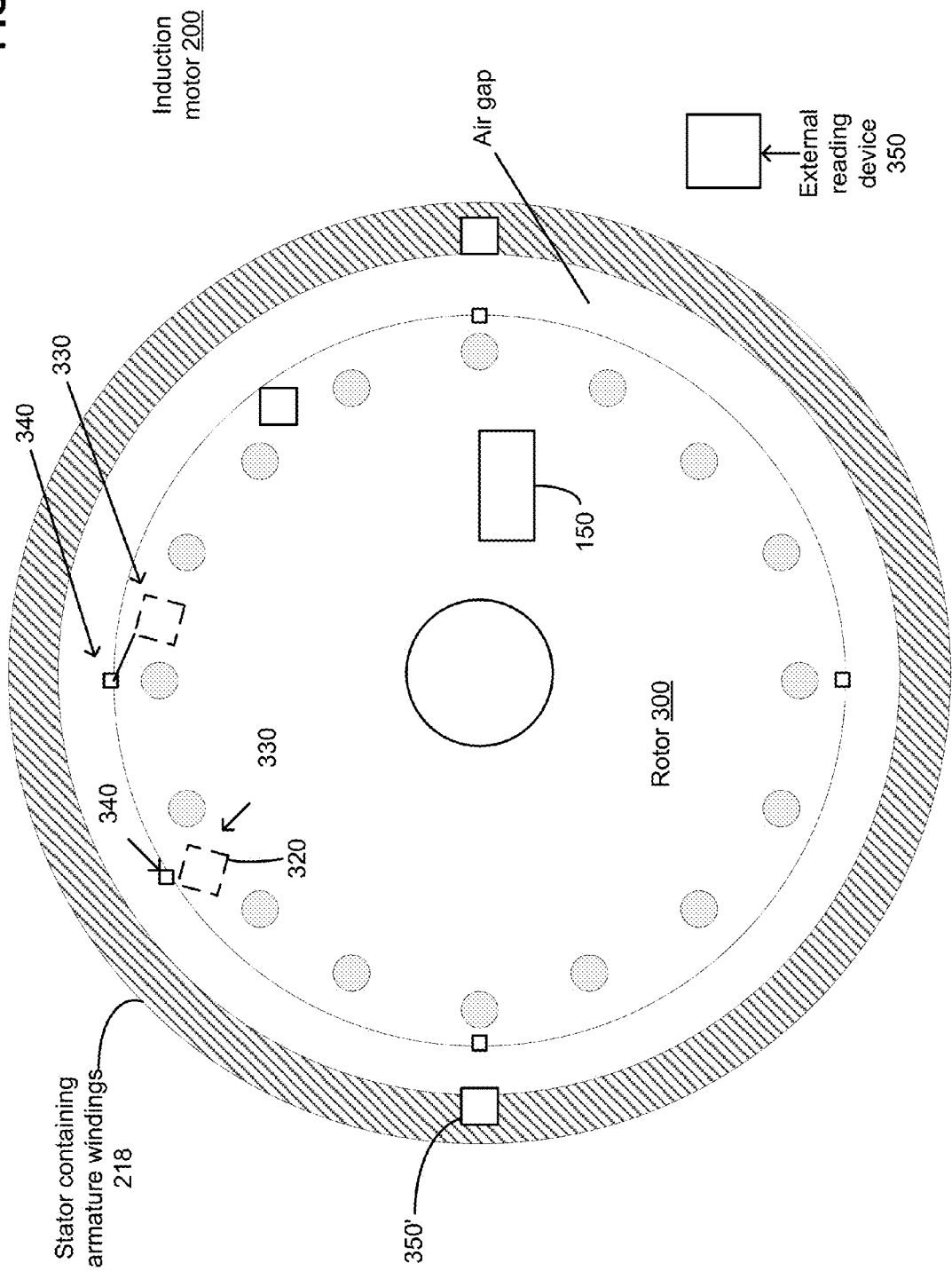
FIG. 3 is a schematic diagram illustrating an exemplary rotor assembly with one or more one or more on-rotor sensors each of which have a sensing portion coupled to an optical readout portion, in accordance with the principles of the solutions described herein; and, FIGS. 4-6 are flow diagrams illustrating exemplary features of methods that relate to use of smart rotors, in accordance with the principles of the solutions described herein.

FIG. 3 shows an exemplary rotor assembly 300 for a motor. Rotor assembly 300 may, for example, be a wound rotor or a squirrel cage type rotor. Rotor assembly 300 includes a rotatable body 300 (or rotor core) and one or more on-rotor sensors 320. A sensor 320 may have a sensing portion 330 coupled to a physical optical readout portion 340. Sensing portion 330 may be configured to sense a motor parameter during motor operation and display its value on optical readout portion 340. Optical readout portion 340 may be disposed, for example, on a cylindrical surface of rotor 300. Alternatively, optical readout portion 340 may be disposed on a side face of rotor 300. Optical readout portion 340 may be arranged so that it can be optically read by an external reading device 350. For example, with reference to FIG. 3, optical readout portion 340 may be arranged to be optically read by external reading device 350' disposed on a stator (e.g., stator 218) in which rotor assembly 300 is disposed.

The values of the motor parameter readout by external reading device 350 may be transmitted to a motor controller, for example, to dynamically control motor operations or to maintain a log of motor characteristics.

On-rotor sensor 320 may, for example, be a battery-powered sensor, a capacitively-powered sensor an inductively-powered sensor, an optically powered sensor, and/or a sensor powered by energy scavenged from the motor environment or operation. Optical readout portion 340 of sensor 320 may, for example, be a liquid crystal display, a micro mirror, a vibrating mirror/cornercube, an LED, and/or a MEMS-actuated flag. Optical readout portion 340 may be arranged to serially provide individual readout values of the motor parameter corresponding to a plurality of individual rotor axial/radial positions, for example, as rotor assembly 310 rotates during motor operation. Alternatively or additionally, optical readout portion 340 may be arranged to provide a multiplexed readout values of the motor parameters, for example, ones corresponding to a plurality of individual rotor axial/radial positions in motor operation.

FIGS. 4, 5 and 6 are flow diagrams respectively showing exemplary features of methods 400, 500 and 600, which relate to use of smart rotors.

Method 400 includes, during operation of an electrical motor having a rotor with at least one current-carrying winding, sensing a motor property using at least one rotor-mounted sensor (410), and dynamically modifying a property of the current-carrying winding during motor operation in response to the sensed motor property (420). The sensed motor property may, for example, be one of a winding current, temperature, rotor speed, and or angular acceleration. Rotor-mounted circuitry may be used to modify a property of the current-carrying winding. The rotor-mounted circuitry may include one or more active electronic devices and/or circuits. The rotor-mounted circuitry may include one or more electronic switching devices (e.g., a triac, a silicon-controlled rectifier, solid state relay, switching transistors and/or a thyristor). Alternatively or additionally, the rotor-mounted circuitry may include one or more linear electronic devices and/or circuits (e.g., a MOSFET, IGBT, bipolar transistor). The rotor-mounted circuitry may include one or more active or passive electronic devices (e.g., resistance, inductance, capacitance, voltage source, current source) placed in series or parallel with all or a portion of the current-carrying winding. The rotor-mounted circuitry may include a switch-mode regulator or a switch-mode power supply. The switch-mode regulator may switch the property of the current-carrying winding at a rate higher than the rotor's angular frequency. An effective value of the property of the current-carrying winding may be determined by a switching pulse rate, pulse width and/or amplitude of a switched variable.

In method 400, the rotor-mounted circuitry may be used to modify a current and/or an impedance of the current-carrying winding. The rotor-mounted circuitry may be configured to vary the property of the current-carrying winding in time as function of a rotor angle or rate, for example, in a continuous function. The rotor-mounted circuitry may be configured to vary the property of the current-carrying winding between a set of discrete property values.

Further, in method 400, a controller may be deployed to supervise operation of the at least one rotor-mounted sensor and the rotor-mounted circuitry. The controller may have algorithms, routines, or programs for controlling or regulating a motor operating parameter (e.g., starting current, rotor temperature, power consumption, and/or a torque). The controller may include rotor-mounted controller components and/or off-rotor controller components. The off-rotor components communicate with the rotor-mounted circuitry, the at least one rotor-mounted sensor and/or the one or more rotor-mounted controller components by any suitable means (e.g., via optical, RF, induction, acoustic, and/or brush connection means). The controller may receive data inputs and commands from off-rotor sensors and/or external sources.

With reference to FIG. 5, method 500 includes, in an induction motor having a squirrel cage rotor with conductive bars or circuits, sensing a motor characteristic during motor operation (510), and switching one or more individual conductive circuits in the rotor during motor operation to control or regulate an operational motor parameter (520). The controlled or regulated operational motor parameter may, for example, be one of startup current, rotor speed and/or torque.

In method 500, switching conductive circuits may include open- or close-circuiting individual bars and/or connecting individual circuits to rotor-mounted energy sources. The rotor-mounted energy sources may include one or more of inductors and/or capacitors, switch mode power supplies, a primary and/or a secondary battery, etc. The method may include recharging an energy storage element during motor operation. Alternatively or additionally, the method may include receiving energy from an off-rotor supply and storing the same in the rotor-mounted energy sources prior to motor start up. The method may include providing energy to individual elements from the rotor-mounted energy sources to flow currents in the rotor prior to motor start up (e.g., to regulate or control motor back-electromotive forces). The energy may be provided to individual elements from the rotor-mounted energy sources according to for, example, a torque-to-load program or schedule.

Further, switching conductive bars may include deploying circuitry configured to switch individual circuits to control an operational motor parameter as function of one or more of a shaft angle, a magnetic field angle or phase, a motor current draw and/or a sensed temperature. The circuitry may, for example, include diodes, transistors, and switching-mode or other power supplies.

With reference to FIG. 6, method 600 includes providing a rotor assembly for a motor (610). The rotor-assembly may include an on-rotor sensor with a sensing portion coupled to an optical readout portion arranged to be optically read by an external reading device. The on-rotor sensor may, for example, be one of a battery-powered sensor, an inductively-powered sensor and/or an optically powered sensor. The optical readout portion may, for example, be one or more of a liquid crystal display, a micro mirror, an LED, an actuated mirror/cornercube, and/or a MEMS-actuated flag. Method 600 further includes sensing a motor parameter during motor operation (620), and displaying the sensed motor parameter values on the optical readout portion (630).

In method 600, the optical readout portion may be arranged to be optically read by the external reading device disposed on or about a stator with respect to which the rotor assembly rotates.

Further, the optical readout portion may be arranged to serially or in parallel provide individual readout values of the motor parameter corresponding to a plurality of individual rotor axial/radial parameters. Alternatively or additionally, the optical readout portion may be arranged to provide multiplexed readout values of the motor parameter corresponding to a plurality of individual rotor axial/radial parameters.

In the detailed description, reference is made to the accompanying drawings, which form a part hereof. In the drawings, similar symbols typically identify similar components, unless context dictates otherwise. The illustrative embodiments described in the summary, detailed description, drawings, and claims are not meant to be limiting. Other embodiments may be utilized, and other changes may be made, without departing from the spirit or scope of the subject matter presented here. Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processing circuits (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processing circuits (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.). Further, those skilled in the art will recognize that the mechanical structures disclosed are exemplary structures and many other forms and materials may be employed in constructing such structures.

In a general sense, those skilled in the art will recognize that the various embodiments described herein can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems for generation, transmission and distribution of electrical power, a communications system (e.g., a networked system, a telephone system, a Voice over IP system, wired/wireless services, etc.).

One skilled in the art will recognize that the herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. For example, even through the solutions described herein are in the context of electrical rotation machinery including motors and generators, the same or similar solutions are applicable to linear/stepper motors and generators, etc.

Further, for example, rotor properties may be modified during machine operation by rotor-mounted actuators or electro-mechanical devices. The rotor-mounted actuators or electro-mechanical devices may be deployed in addition to or instead of the rotor-mounted circuitry described herein with respect to FIGS. 1-6. The rotor-mounted actuators or electro-mechanical devices may include mechanisms for changing the mechanical configuration or properties of a rotor (e.g., rotor moment distribution, pitch of turbine blades, etc.). The mechanisms may, for example, include counter weights, torque-limiting loads, stabilizers, electro-mechanical clutches, displaceable shaft-mounted rotor components, etc.

Further, for example, rotor-mounted controller components and/or off-rotor controller components of a rotating machine may include suitable interfaces to digital networks. Such interfaces may allow for system wide remote control or supervision of one or more rotating machine. Each rotating machine (e.g., a turbine or generator) in a system may be individually addressable over the interconnecting network.

The invention claimed is:

1. A method of fabricating an electrical rotating machine, the method comprising:
    disposing at least one current-carrying circuit on a rotor of an electrical rotating machine;
    mounting on the rotor at least one rotor-mounted sensor configured to sense an electrical machine property during machine operation; and
    mounting on the rotor rotor-mounted electrical circuitry responsive to the rotor-mounted sensor; and
    configuring a controller to supervise operation of the at least one rotor-mounted sensor and the rotor-mounted circuitry, wherein the electrical circuitry is configured to dynamically modify a property of the current-carrying circuit during machine operation in response to the sensed electrical machine property and wherein the controller is configured to receive data inputs, settings, and commands from off-rotor sensors or external sources.

2. The method of claim 1, wherein the at least one rotor-mounted sensor is configured to sense at least one of a circuit voltage, a circuit current, a magnetic field, a magnetic permeability, a temperature, a speed, a rotation rate, a rotation angle and/or an angular acceleration.

3. The method of claim 1, wherein the rotor-mounted circuitry configured to modify a property of the current-carrying circuit includes one or more electronic switching devices.

4. The method of claim 3, wherein the electronic switching device includes one or more of a triac, a silicon-controlled rectifier, solid state relay, and/or a thyristor.

5. The method of claim 1, wherein the rotor-mounted circuitry configured to modify a property of the current-carrying circuit includes a linear electronic device and/or circuit.

6. The method of claim 5, wherein the linear electronic device and/or circuit includes at least one of a MOSFET, an IGBT, and/or a bipolar transistor.

7. The method of claim 1, wherein the rotor-mounted circuitry configured to modify a property of the current-carrying circuit includes one or more active or passive electronic devices placed in series and/or parallel with all or part of the current-carrying circuit.

8. The method of claim 1, wherein the rotor-mounted circuitry configured to modify a property of the current-carrying circuit includes a voltage source, and/or a current source, a source of electrical reactance, and/or energy storage/supply device.

9. The method of claim 8, wherein the energy storage/supply device includes one or more of an inductor, a capacitor, a primary and/or secondary battery.

10. The method of claim 8, wherein the energy storage/supply device includes a device that is rechargeable during machine operation.

11. The method of claim 1, wherein the rotor-mounted circuitry is configured to modify one or more of real and/or reactive impedance, capacitance, reluctance, magnetic saturation, inductance and/or mutual inductance of the current-carrying circuit.

12. The method of claim 1, wherein the rotor-mounted circuitry is configured to vary the property of the current-carrying circuit as a function of rotor angle or position, rotation rate, and/or angular acceleration.

13. The method of claim 1, wherein the rotor-mounted circuitry is configured to vary the property of the current-carrying circuit as a continuous function.

14. The method of claim 1, wherein the rotor-mounted circuitry is configured to vary the property of the current-carrying circuit between a set of discrete property values.

15. The method of claim 1, wherein the rotor-mounted circuitry is configured to vary the property of the current-carrying circuit in response to a time history of sensor values.

16. The method of claim 1, wherein the rotor-mounted circuitry configured to vary the property of the current-carrying circuit includes a switch-mode regulator.

17. The method of claim 16, wherein the switch-mode regulator switches the property of the current-carrying circuit at a rate higher than a nominal frequency.

18. The method of claim 17, wherein the nominal frequency of the electrical machine is the rotor's angular frequency or a pole frequency of the electrical machine.

19. The method of claim 17, wherein the nominal frequency is about 15 KHz.

20. The method of claim 17, wherein the nominal frequency is about 100 KHz.

21. The method of claim 17, wherein the nominal frequency is about 1 MHz.

22. The method of claim 1, wherein the controller is configured or programmed to regulate a machine operating parameter.

23. The method of claim 1, wherein the machine operating parameter is one of a starting current, a running current, a rotor speed and/or acceleration, a temperature at a rotor location, a power consumption, and/or a torque.

24. The method of claim 1, wherein the controller includes one or more rotor-mounted controller components and/or off-rotor controller components.

25. The method of claim 24, wherein off-rotor components are configured to communicate with the rotor-mounted circuitry, the at least one rotor-mounted sensor and/or the one or more rotor-mounted controller components via optical, RF, acoustic, ultrasound, inductive, capacitive, and/or conducting means.

26. A method of fabricating an electrical rotating machine, the method comprising:
disposing at least one current-carrying circuit on a rotor of an electrical rotating machine;
mounting on the rotor at least one rotor-mounted sensor configured to sense an electrical machine property during machine operation; and
mounting on the rotor rotor-mounted electrical circuitry responsive to the rotor-mounted sensor, wherein the electrical circuitry is configured to dynamically modify a property of the current-carrying circuit during machine operation in response to the sensed electrical machine property, wherein the rotor-mounted circuitry configured to modify a property of the current-carrying circuit includes a voltage source, and/or a current source, a source of electrical reactance, and/or energy storage/supply device.

27. The method of claim 26, wherein the at least one rotor-mounted sensor is configured to sense at least one of a circuit voltage, a circuit current, a magnetic field, a magnetic permeability, a temperature, a speed, a rotation rate, a rotation angle and/or an angular acceleration.

28. The method of claim 26, wherein the rotor-mounted circuitry configured to modify a property of the current-carrying circuit includes one or more electronic switching devices.

29. The method of claim 26, wherein the rotor-mounted circuitry configured to modify a property of the current-carrying circuit includes a linear electronic device and/or circuit.

30. The method of claim 29, wherein the linear electronic device and/or circuit includes at least one of a MOSFET, an IGBT, and/or a bipolar transistor.

31. The method of claim 26, wherein the rotor-mounted circuitry configured to modify a property of the current-carrying circuit includes one or more active or passive electronic devices placed in series and/or parallel with all or part of the current-carrying circuit.

32. The method of claim 26, wherein the energy storage/supply device includes one or more of an inductor, a capacitor, a primary and/or secondary battery.

33. The method of claim 26, wherein the energy storage/supply device includes a device that is rechargeable during machine operation.

34. The method of claim 26, wherein the rotor-mounted circuitry is configured to modify one or more of real and/or reactive impedance, capacitance, reluctance, magnetic saturation, inductance and/or mutual inductance of the current-carrying circuit.

35. The method of claim 26, wherein the rotor-mounted circuitry is configured to vary the property of the current-carrying circuit as a function of rotor angle or position, rotation rate, and/or angular acceleration.

36. The method of claim 26, wherein the rotor-mounted circuitry is configured to vary the property of the current-carrying circuit as a continuous function.

37. The method of claim 26, wherein the rotor-mounted circuitry is configured to vary the property of the current-carrying circuit in response to a time history of sensor values.

38. The method of claim 26, wherein the rotor-mounted circuitry configured to vary the property of the current-carrying circuit includes a switch-mode regulator.

39. The method of claim 26, further comprising, a controller configured to supervise operation of the at least one rotor-mounted sensor and the rotor-mounted circuitry.

40. A method of fabricating an electrical rotating machine, the method comprising:
- disposing at least one current-carrying circuit on a rotor of an electrical rotating machine;
- mounting on the rotor at least one rotor-mounted sensor configured to sense an electrical machine property during machine operation; and
- mounting on the rotor rotor-mounted electrical circuitry responsive to the rotor-mounted sensor; and
- configuring a controller to supervise operation of the at least one rotor-mounted sensor and the rotor-mounted circuitry, wherein the electrical circuitry is configured to dynamically modify a property of the current-carrying circuit during machine operation in response to the sensed electrical machine property and wherein the controller is configured to receive data from off-rotor data sources.

* * * * *